US 8,339,395 B2

(12) United States Patent
Gruetzmacher (10) Patent No.: US 8,339,395 B2
(45) Date of Patent: Dec. 25, 2012

(54) METHOD AND APPARATUS FOR MODEL COMPRESSION

(75) Inventor: Grant P. Gruetzmacher, Manassas Park, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 1204 days.

(21) Appl. No.: 12/216,574

(22) Filed: Jul. 8, 2008

(65) Prior Publication Data

US 2010/0008593 A1    Jan. 14, 2010

(51) Int. Cl.
*G06T 15/00* (2011.01)
(52) U.S. Cl. ......................... 345/420; 345/423
(58) Field of Classification Search .................. None
See application file for complete search history.

(56) References Cited

U.S. PATENT DOCUMENTS

| | | | |
|---|---|---|---|
| 5,825,369 A * | 10/1998 | Rossignac et al. | 345/440 |
| 6,167,159 A * | 12/2000 | Touma et al. | 382/242 |
| 6,262,737 B1 | 7/2001 | Li et al. | |
| 6,314,205 B1 | 11/2001 | Masuda et al. | |
| 6,445,389 B1 | 9/2002 | Bossen et al. | |
| 6,452,596 B1 | 9/2002 | Gueziec et al. | |
| 6,525,722 B1 * | 2/2003 | Deering | 345/419 |
| 6,614,428 B1 | 9/2003 | Lengyel | |
| 6,668,091 B1 | 12/2003 | Kim et al. | |
| 6,718,290 B1 | 4/2004 | Szymczak et al. | |
| 6,995,761 B1 | 2/2006 | Schroeder et al. | |
| 7,062,419 B2 | 6/2006 | Grzeszczuk et al. | |
| 2002/0063707 A1 * | 5/2002 | Kawanaka | 345/423 |
| 2004/0217956 A1 | 11/2004 | Besl et al. | |
| 2004/0218824 A1 | 11/2004 | Demaret et al. | |

* cited by examiner

*Primary Examiner* — Daniel Hajnik
*Assistant Examiner* — Andrew G Yang
(74) *Attorney, Agent, or Firm* — Oliff & Berridge, PLC (57) ABSTRACT

Aspects of the disclosure provide a lossless compression method for 3D mesh models. The method can be combined or layered with other compression methods to provide additional data compression capability. The method for compressing a mesh model having geometry information and connectivity information of vertices can include defining a first set of vertices having a same connectivity property, determining a subset of the first set of vertices that are encompassed by an area defined by the first set of vertices, and encoding the mesh model without the connectivity information for the subset of the first set of vertices.

15 Claims, 8 Drawing Sheets

METHOD AND APPARATUS FOR MODEL COMPRESSION

BACKGROUND

In three dimensional (3D) applications, such as computer aided design, visualization, video games, and the like, 3D shapes can be represented as mesh models, such as triangular mesh models. A 3D triangular mesh model may include a large number of triangles, such as a model representing a complex shape and/or a model having a high resolution. As a result of the large number of triangles that are requested by the model, the 3D triangular mesh model can have a large data size, which requires a large amount of resource for processing. For example, a 3D triangular mesh model may require a large storage space for storing the model. In another example, to ensure transmitting a 3D triangular mesh model timely via a communication channel, a large bandwidth may be required.

The large data size of the 3D mesh model may exceed hardware or system capability, or may result in shortages of resources for other applications. Generally, the data size of the 3D mesh model can be reduced by various compression techniques.

SUMMARY

Aspects of the disclosure can provide a lossless compression method for 3D mesh models. The method can be combined or layered with other compression methods to provide additional data compression capability.

The method for compressing a mesh model having geometry information and connectivity information of vertices can include defining a first set of vertices having a same connectivity property, determining a subset of the first set of vertices that are encompassed by an area defined by the first set of vertices, and encoding the mesh model without the connectivity information for the subset of the first set of vertices.

Further, to define the first set of vertices having the same connectivity property, the method can include defining the first set of vertices having a same valence. In addition, the same valence can be a dominant valence. Alternatively, the same valence can be a regular valence.

In an embodiment, the mesh model can be a triangular mesh model and the connectivity information comprises triangles formed by vertices. Further, to encode the mesh model, the method can include encoding the subset of the first set of vertices with an order, the order systematically traversing triangles of the area. Accordingly, the method can include decoding the connectivity information of the subset of the first set of vertices with the order by systematically recovering the triangles of the area to satisfy the valence of the vertices.

According to aspects of the disclosure, the method can also include encoding the mesh model with the connectivity information for a second set of vertices. The second set of vertices can include a vertex having a different connectivity property from the first set of vertices. For example, the vertex can have a different valence from the first set of vertices.

In an embodiment, the second set can include all the vertices that have different valences from the first set of vertices. Further, the second set can include boundary vertices having the same valence of the first set of vertices. Additionally, the second set can be a minimal span skeleton of all the vertices having different valences from the first set of vertices.

In an example, the method can include encoding the second set of vertices with a connectivity compression algorithm, such as an Edge-Breaker algorithm. In another example, the method can include encoding the geometry information for the vertices with a geometry compression algorithm.

Aspects of the disclosure can also provide an apparatus for compressing a mesh model having geometry information and connectivity information of vertices. The apparatus can include a processor configured to define a first set of vertices having a same connectivity property, determine a subset of the first set of vertices that are encompassed by an area defined by the first set of vertices, and encode the mesh model without the connectivity information for the subset of the first set of vertices.

Further, the apparatus can include a storage unit configured to store the encoded mesh model. In addition, the apparatus can include a communication interface configured to transmit the encoded mesh model via a communication channel. In an embodiment, the apparatus can include a memory medium configured to store instructions causing the processor to compress the mesh model.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
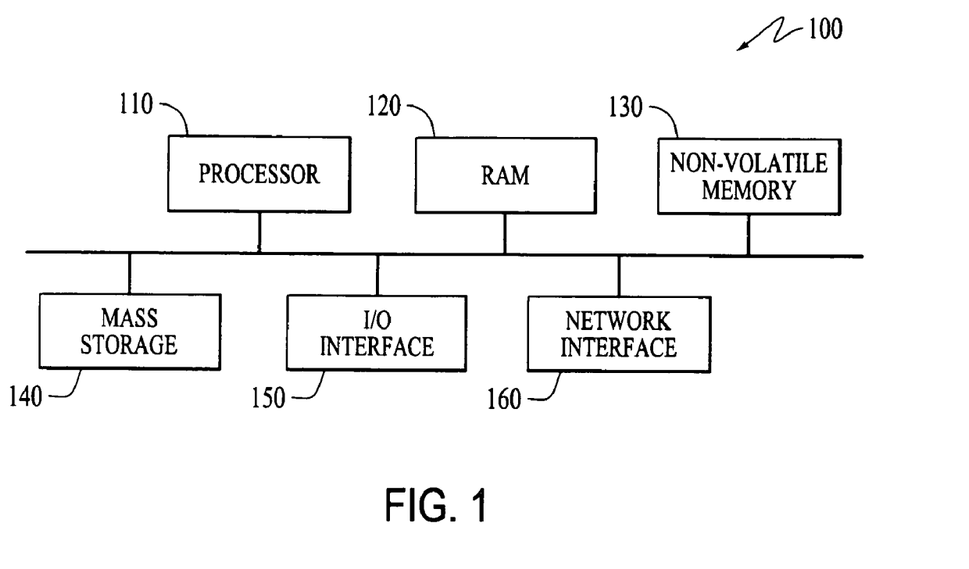
FIG. 1 shows a block diagram of an exemplary computing system for 3D mesh model compression.

FIG. 1 shows a block diagram of an exemplary computing system for 3D mesh model compression. The computing system 100 may include a processor 110 for 3D mesh model data compression, a random access memory (RAM) 120, a non-volatile memory 130, a mass storage 140, an I/O interface 150, and a network interface 160. These components can be coupled together as shown in FIG. 1.

The processor 110 may perform data compression for 3D mesh models. According to the disclosure, the processor 110 may perform a lossless data compression method on a 3D mesh model by reducing a portion of the mesh model data that can be implicitly determined. More specifically, the processor 110 may utilize knowledge of the 3D mesh model to implicitly save certain model data. For example, the processor 110 may receive a 3D mesh model and determine, for example, a regular region of the 3D mesh model. The regular region may include connectivity information that can be implicitly determined without explicitly being included in the 3D mesh model. Further, the processor 110 may encode the 3D mesh model without explicitly including the connectivity information of the regular region. Therefore, a data size for the 3D mesh model can be reduced.

In an embodiment, the lossless data compression method can be implemented as a software program, which can be stored in the non-volatile memory 130. The software program can be executed by the processor 110 to compress the 3D mesh model and reduce the data size of the 3D mesh model. Thus, the compressed 3D mesh model can be stored in the mass storage 140 with a reduced storage space.

Additionally, the compressed 3D mesh model can be transmitted to another computing system via the network interface 160. The transmission of the compressed 3D mesh model can be achieved with a reduced transmission time. Alternatively, the transmission of the compressed 3D model may require a reduced bandwidth.

On the other hand, the computing system 100 can be suitably configured to perform de-compression according to the disclosure. In an embodiment, a decompression method corresponding to the lossless data compression method can be implemented as a software program, which can be stored in the non-volatile memory 130, for example. The software program can be executed by the processor 110 to de-compress a compressed 3D mesh model to recover an original 3D mesh model, for example for displaying. In an example, the computing system 100 may receive a compressed 3D mesh model, for example from the network interface 160 or from the mass storage 140. Further, the processor 110 may execute the software program to decompress the compressed 3D mesh model to recover the original 3D mesh model. Then, the recovered 3D mesh model can be displayed by a display device (not shown).

According to the disclosure, the lossless data compression method can be combined or layered with other 3D mesh model compression methods, such as Edge-Breaker, geometry compression, and the like, to provide additional data compression capability.

Figure 2:
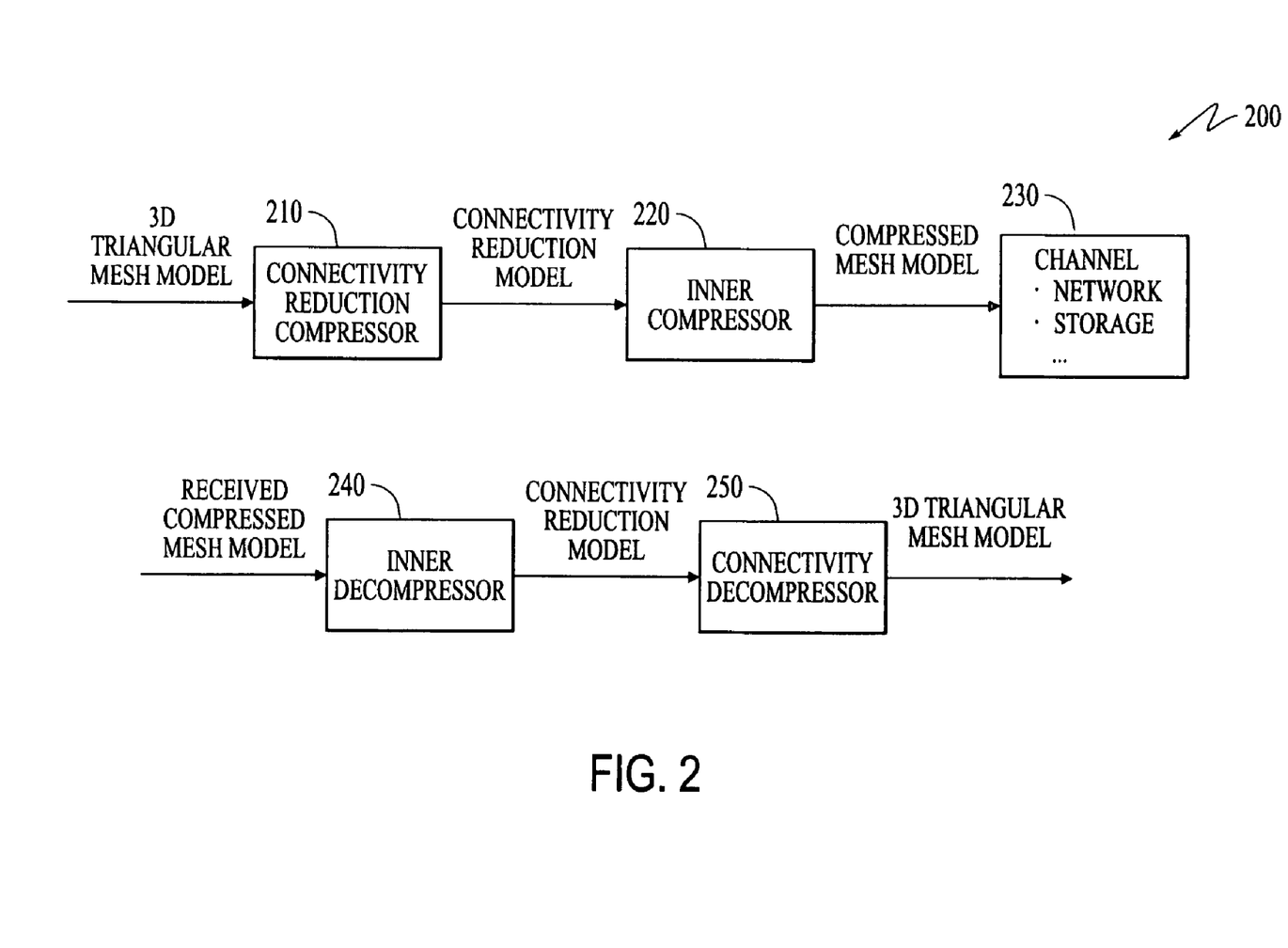
FIG. 2 shows a block diagram of an exemplary 3D mesh model compression system.

FIG. 2 shows a block diagram of an exemplary 3D mesh model compression system 200. The 3D mesh model compression system 200 can include a connectivity reduction based compressor 210, an inner compressor 220, an inner de-compressor 240, and a connectivity based de-compressor 250.

The connectivity reduction based compressor 210 can receive a 3D mesh model, such as a 3D triangular mesh model, and analyze the 3D mesh model for regions where connectivity can be implicitly determined, such as a regular region where vertices are of a regular valence. Further, the connectivity reduction based compressor 210 can, for example, implicitly save the connectivity of the regular region, to reduce a data size of the 3D triangular mesh model, and output a connectivity reduction 3D mesh model. The connectivity reduction 3D mesh model can be further compressed by the inner compressor 220. The inner compressor 220 may apply other compression techniques, such as geometry compression technique, Edge-breaker technique, and the like, to further compressed the 3D mesh model.

In an embodiment, the inner compressor 220 may include a geometry compressor, which can compress the geometry information of the connectivity reduction 3D mesh model.

In another example, the connectivity reduction 3D mesh model may include a first portion and a second portion. The first portion may include a first set of vertices that the connectivity information of the first set of vertices can be implicitly saved to reduce a data size, while the second portion may include a second set of vertices that the connectivity information of the second set of vertices can be explicitly included in the model. The explicitly included connectivity information can be further compressed by a connectivity compressor, such as an Edge-Breaker compressor. For example, the inner compressor 220 may include an Edge-Breaker compressor. The Edge-Breaker compressor may compress the connectivity information of the second set of vertices to further reduce the data size of the 3D mesh model.

The compressed 3D mesh model can be transmitted over the channel 230. The channel 230 may include any medium or device that data can transmit between the compressors and the de-compressors. In an embodiment, the channel 230 may include a network, such as LAN, WAN, Internet, and the like. In another embodiment, the channel 230 may include a mass storage medium, such as a hard disk, a CD, a DVD, and the like.

The compressed 3D mesh model can be received by a receiver. The receiver may include a decompression component. The decompression component can decompress the compressed 3D mesh model, and recover the original 3D mesh model. As shown in FIG. 2, the decompression component may include the inner de-compressor 240 and the connectivity de-compressor 250. The inner de-compressor 240 can decompress the compressed 3D mesh model corresponding to the compression method of the inner compressor 220. Therefore, the inner de-compressor 240 can recover the connectivity reduction model from the compressed 3D mesh model. Further, the connectivity based de-compressor 250 may decompress the 3D connectivity reduction mesh model. More specifically, the connectivity based de-compressor 250 may determine the connectivity information that are not explicitly included to recover the original 3D mesh model.

Generally, a 3D mesh model, for example a 3D triangular mesh model, may include a vertex portion and a connectivity portion. The vertex portion may generally include geometry information, such as coordinates corresponding to each vertex. Optionally, the vertex portion may include photometry feathers, such as texture, color, and the like. The connectivity portion may include vertex connectivity information, for example in form of triangles defined by three vertices corresponding to a triangle in a 3D triangular mesh model.

Figure 3A:
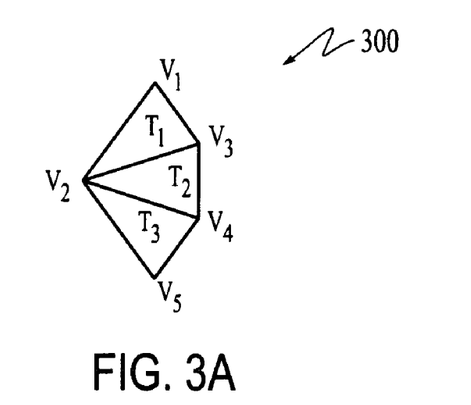
FIGS. 3A-3C show an example of a portion of a 3D triangular mesh model.
Figure 3B:
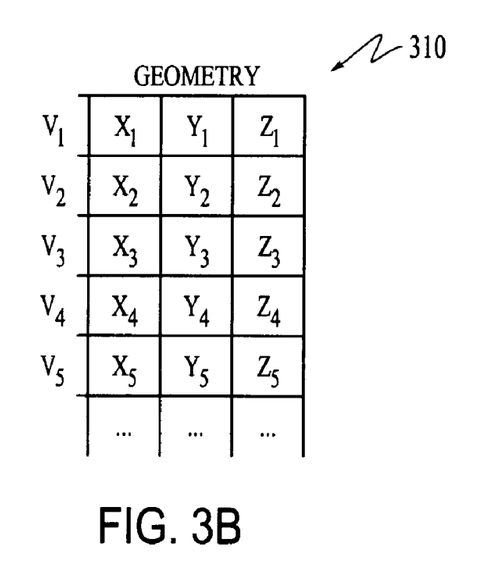
Figure 3C:
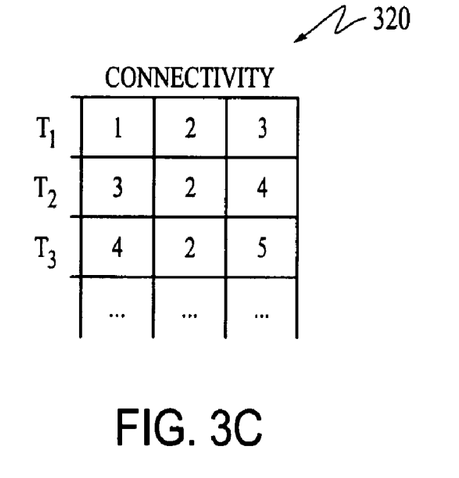

FIGS. 3A-3C show an example of a portion of a 3D triangular mesh model. FIG. 3A shows an exemplary graph of the portion of the 3D triangular mesh model. The 3D triangular mesh model 300 may include vertices $V_1$ to $V_5$, whose connectivity can be defined by $T_1$ to $T_3$. The 3D triangular mesh model 300 can be stored according to a geometry data structure and a connectivity data structure.

FIG. 3B shows an exemplary geometry data structure 310 corresponding to the 3D triangular mesh model 300. The geometry data structure 310 may include a table that stores three coordinates for each vertex of $V_1$ to $V_5$.

FIG. 3C shows an exemplary connectivity data structure 320 corresponding to the 3D triangular mesh model 300. The connectivity data structure 320 may include a table that stores three integer references identifying three vertices for each triangle of $T_1$ to $T_3$.

Generally, a 3D triangular mesh model may include triangles that can be roughly twice a number of vertices. Therefore, the connectivity data structure may require a storage space that can be substantially twice as large as a storage space for the geometry data structure. According to the disclosure, a portion of the connectivity information can be implicitly determined by considering properties of the 3D triangular mesh model, such as dominant valence region and geometry ordering. Therefore, the portion of the connectivity information may not be explicitly included in the 3D triangular mesh model. Thus, the 3D triangular mesh model may have a reduced data size.

In an embodiment, a processor, such as the processor 110, may statistically analyze a connectivity property, such as valence (number of adjacent edges) of a vertex, and determine a dominant valence. Further, the processor may determine a dominant valence region where vertices including boundary vertices can have the dominant valence.

In another embodiment, a processor, such as the processor 110, may determine a regular valence region where vertices including boundary vertices can have a regular valence. For example, the processor may determine a regular valence region of a 3D triangular mesh model. The regular valence region may include vertices of a regular valence, such as 6 for a triangular mesh model.

Figure 4:
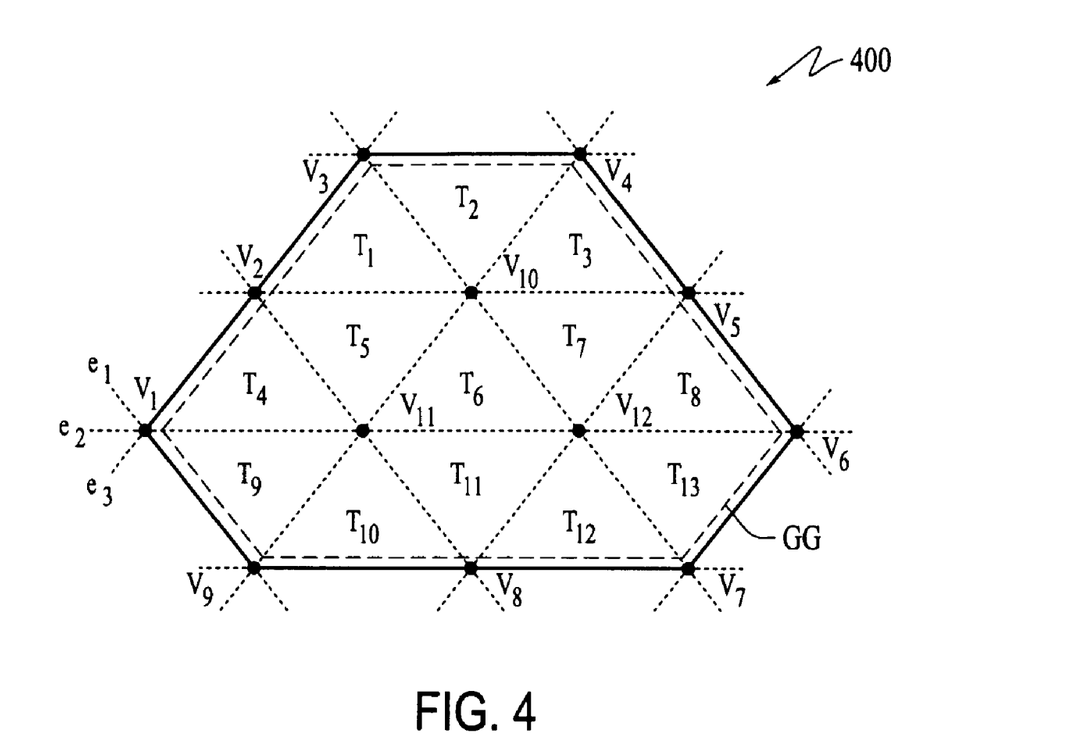
FIG. 4 shows an exemplary regular valence region of a 3D triangular mesh model.

FIG. 4 shows an exemplary regular valence region of a 3D triangular mesh model. The regular valence region 400 can include 12 vertices $V_1$-$V_{12}$. Further, the regular valence region 400 can include 13 triangles $T_1$-$T_{13}$ as shown in FIG. 4.

Among the 12 vertices, $V_1$ to $V_9$ can be regular boundary vertices, and $V_{10}$ to $V_{12}$ can be regular internal vertices. The regular boundary vertices may have 6 adjacent edges, however, at least one adjacent edge, such as $e_1$ to $e_3$ for $V_1$, can be connected to non-regular valence vertices (not shown). The regular internal vertices $V_{10}$ to $V_{12}$ can have six adjacent edges that are all connected to regular valence vertices.

According to the disclosure, the triangles $T_1$ to $T_{13}$, which are within the regular valence region 400, can be implicitly determined without explicitly included in the 3D triangular mesh model. Thus, a connectivity reduction 3D triangular mesh model of the 3D triangular mesh model 400 may not explicitly include the triangles $T_1$ to $T_{13}$. Therefore, a data size of the connectivity reduction 3D triangular mesh model can be reduced.

According to the disclosure, a 3D triangular mesh model may include a GG portion. The GG portion can refer to a region of regular vertices excluding regular boundary vertices, and associated triangles. In the FIG. 4 example, a GG portion can include the regular internal vertices $V_{10}$ to $V_{12}$, and $T_1$ to $T_{13}$ as shown in FIG. 4. Additionally, a 3D triangular mesh model may include an EB portion. The EB portion can include non-regular vertices, regular boundary vertices, and associated triangles. Generally, the EB portion and the GG portion can be non overlapped.

According to the disclosure, the connectivity information of the GG portion, such as the triangles $T_1$ to $T_{13}$ in FIG. 4, can be implicitly included to reduce the data size of the 3D triangular mesh model. On the other hand, the connectivity information of the EB portion may need to be explicitly included. In an embodiment, the connectivity information of the EB portion can be compressed by a connectivity compression method, such as an Edge-Breaker method, to further reduce the data size of the 3D triangular mesh model.

Figure 5A:
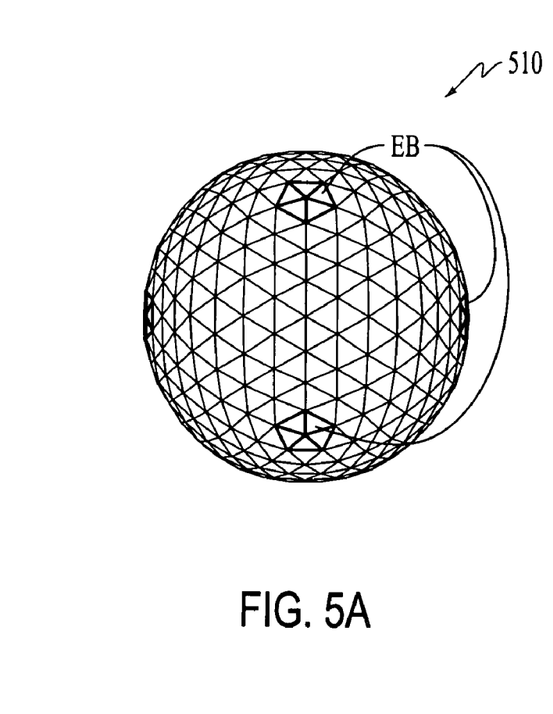
FIGS. 5A-5C show exemplary 3D triangular mesh models for a 3D shape.
Figure 5B:
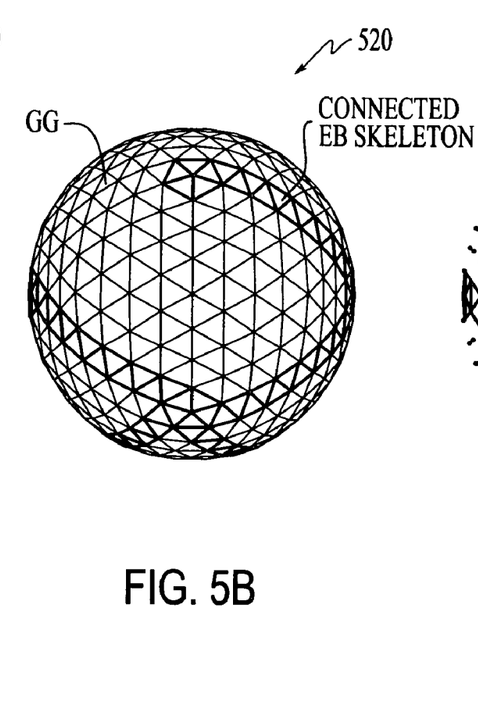
Figure 5C:
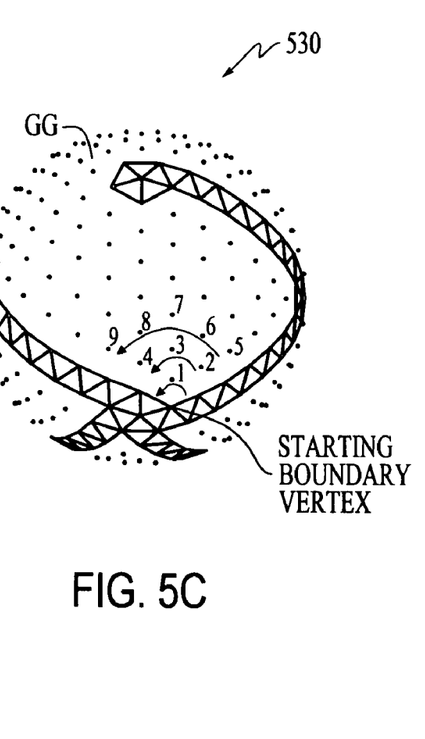

FIGS. 5A-5C show exemplary 3D triangular mesh models for a 3D shape. FIG. 5A shows a 3D triangular mesh model for the 3D shape before a connectivity reduction compression. Due to natures of the 3D shape, the 3D triangular mesh model 510 may include a majority of regular vertices, and a minority of non-regular vertices. The non-regular vertices, boundary regular vertices and associated triangles can form an EB portion. As can be seen, the EB portion may include a plurality of isolated EB regions that are not connected.

FIG. 5B shows a 3D triangular mesh model for the 3D shape with a connected EB portion. As shown in FIG. 5B, the connected EB portion can include the EB regions that are identified in FIG. 5A. Additionally, the connected EB portion can include additional regular vertices and associated triangles that can connect the identified EB regions into the connected EB portion.

In an embodiment, the connected EB portion can be a minimally connected EB portion for the identified EB regions. In another embodiment, a processor, such as the processor 110, may execute a software program to connect the EB regions into a connected EB portion. In another embodiment, a 3D triangular mesh model may include a single identified EB region, therefore a step of connecting the EB regions can be skipped.

As can be seen in the FIG. 5B, the 3D triangular mesh model 520 can include a GG portion excluding the connected EB portion. According to the disclosure, the connectivity information of the GG portion can be determined without explicitly being included in the 3D triangular mesh model.

FIG. 5C shows an exemplary diagram of a connectivity reduction 3D triangular mesh model for the 3D shape according to the disclosure. As can be seen, the reduced 3D triangular mesh model can include a GG portion. The GG portion can include a set of vertices. The geometry information of the set of vertices can be included in the model. However, the connectivity information of the set of vertices is not explicitly included.

In an embodiment, the geometry information of the GG portion can be systematically reordered to provide benefits, such as easy recovering. For example, the vertices in the GG portion can be reordered as shown in FIG. 5C. In an example, a reordering process may identify a starting boundary vertex, and reorder the vertices, for example in a counter clock direction that can traverse a sequence of triangles that are not included in the model. Thus, the sequence of triangles can be recovered during a de-compression process according to the order of the vertices.

Additionally, the reduced 3D triangular mesh model 530 may include a connected EB portion. The connected EB portion can explicitly include the geometry information and the connectivity information of a set of vertices within the connected EB portion. In an embodiment, the connectivity information of the set of vertices within the connected EB portion can be further compressed according to a connectivity compression method, such as an Edge-Breaker compression method.

Figure 6:
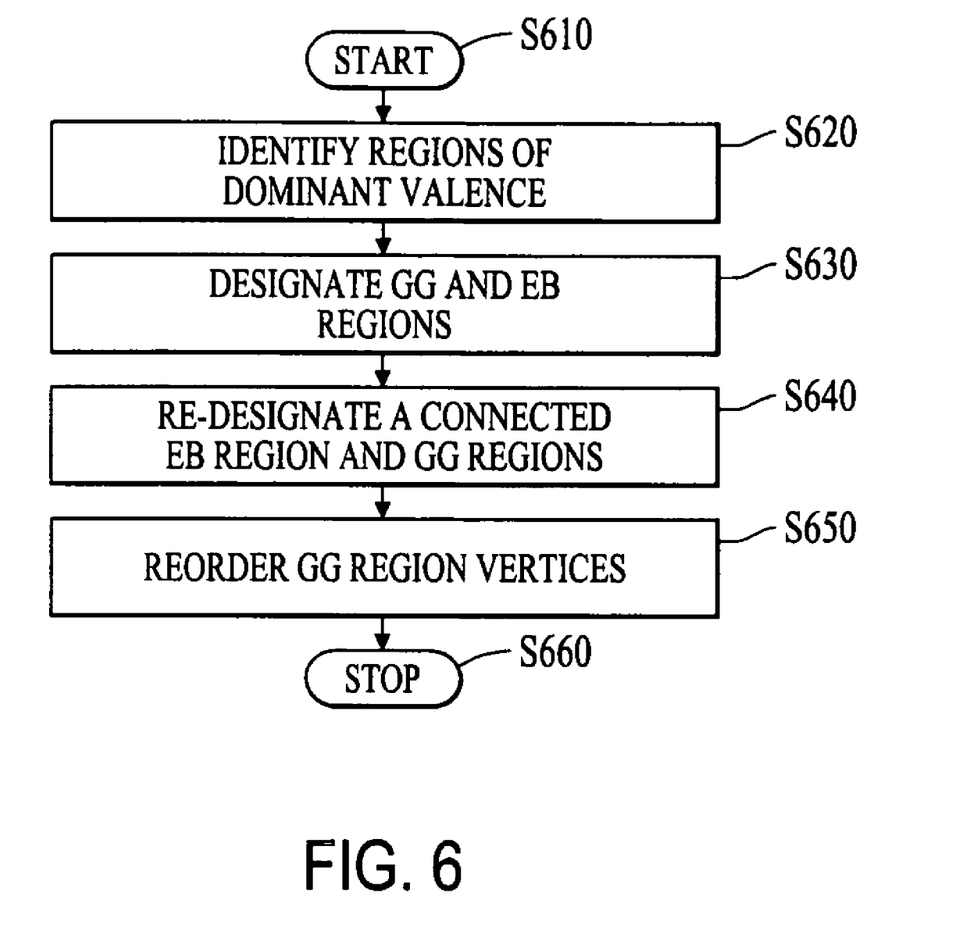
FIG. 6 shows a flowchart outlining an exemplary connectivity reduction compression process.

FIG. 6 shows a flowchart outlining an exemplary compression process, which can convert a 3D triangular mesh model into a connectivity reduction 3D triangular mesh model. The process starts at step S610, and proceeds to step S620.

In step S620, the processor 110 may identify a dominant valence. For example, the processor 110 may statistically analyze vertices of the 3D triangular mesh model, and choose a dominant valence that a majority of the vertices belong to. In another example, the processor 110 may choose a regular valence, for example 6 for a 3D triangular mesh model. The process then proceeds to step S630.

In step S630, the processor 110 may designate GG regions and EB regions of the 3D triangular mesh model. In an embodiment, the GG regions can include regular vertices excluding boundary regular vertices and associated triangles. The EB regions can include non-regular vertices, regular boundary vertices and associated triangles. Then, the process proceeds to step S640.

In step S640, the processor 110 may re-designate the 3D triangular models in form of a single connected EB region and GG regions. In an embodiment, a processor, such as the processor 110, may execute a software program of a connecting algorithm that can connect the EB regions from the previous step into a single connected EB region by adding additional regular vertices and associated triangles. In another embodiment, the previous step may result in a single EB region, step S640 can be skipped. Then, the process proceeds to step S650.

In step S650, the processor 110 may reorder the vertices of the GG regions. The vertices of the GG regions can be reordered in a manner such that the triangles of the GG regions can be reconstructed during a decompression process based on the order of the vertices. In an embodiment, the processor 110 may identify a starting boundary vertex, and order the vertices of the GG regions systematically according to a sequence of the triangles of the GG regions. Subsequently, the connectivity information of the GG regions, for example triangles in the GG regions, can be removed from the 3D triangular mesh model. Thus, the 3D triangular mesh model can be converted to a connectivity reduction 3D triangular mesh model. The process then proceeds to step S660, and terminates.

It should be understood that, the connectivity reduction 3D triangular mesh model can be further compressed by other suitable compression methods, such as Edge-Breaker method, geometry compression method, and the like.

The connectivity reduction 3D triangular mesh model can be de-compressed by various methods. In an embodiment, triangles that are not included in the connectivity reduction 3D triangular mesh model can be reconstructed based on an order of vertices of the connectivity reduction 3D triangular mesh model.

Figure 7:
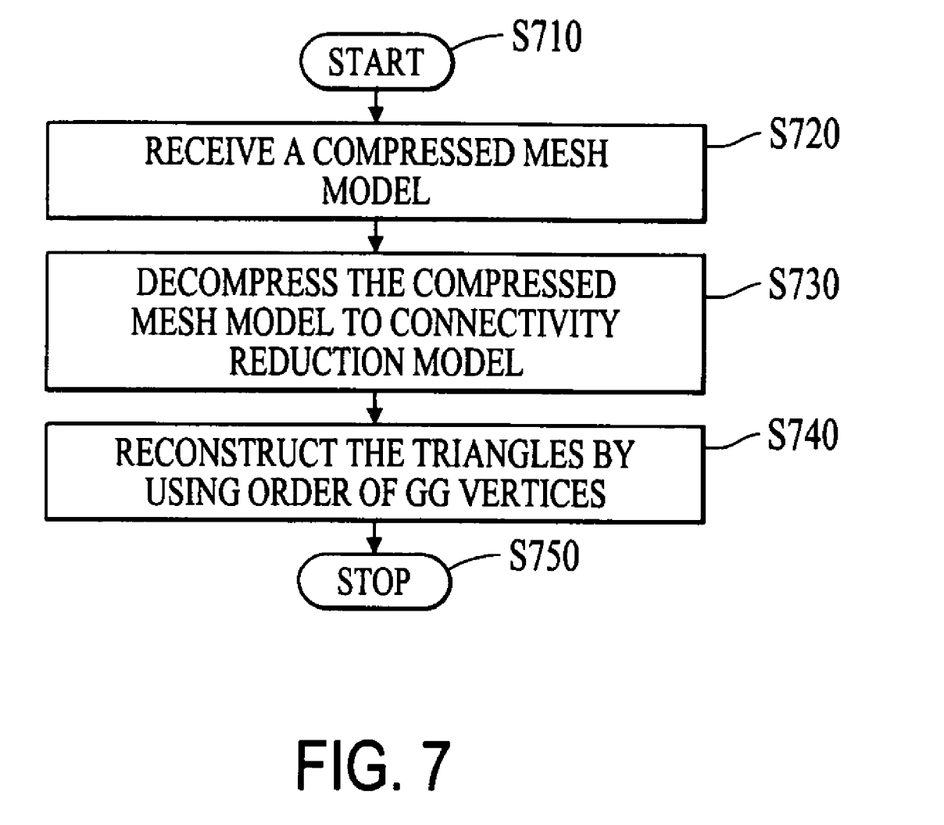
FIG. 7 shows a flowchart outlining an exemplary de-compression process.

FIG. 7 shows a flowchart outlining an exemplary de-compression process, which can convert a compressed 3D triangular mesh model into an original 3D triangular mesh model. The process starts at step S710, and proceeds to step S720.

In step S720, a receiver, such as a computing system 100 shown in FIG. 1, can receive a compressed 3D triangular mesh model, for example from a network or from a mass storage. The compressed 3D triangular mesh model can be compressed by a connectivity reduction compression method and other suitable compression methods that can be layered with the connectivity reduction compression method. The process then proceeds to step S730.

In step S730, a processor, such as the processor 110, may execute a de-compression software program for the other suitable compression methods to recover a 3D connectivity reduction mesh model. In an example, the 3D connectivity reduction mesh model may include a single EB region (a single EB skeleton), and a plurality of GG regions in form of GG vertex clouds. Then, the process proceeds to step S740.

In step S740, the processor may execute a de-compression software program for reconstructing triangles within the GG region based on an order of the vertices in the GG regions. Then, the process proceeds to step S750 and terminates.

Figure 8A:
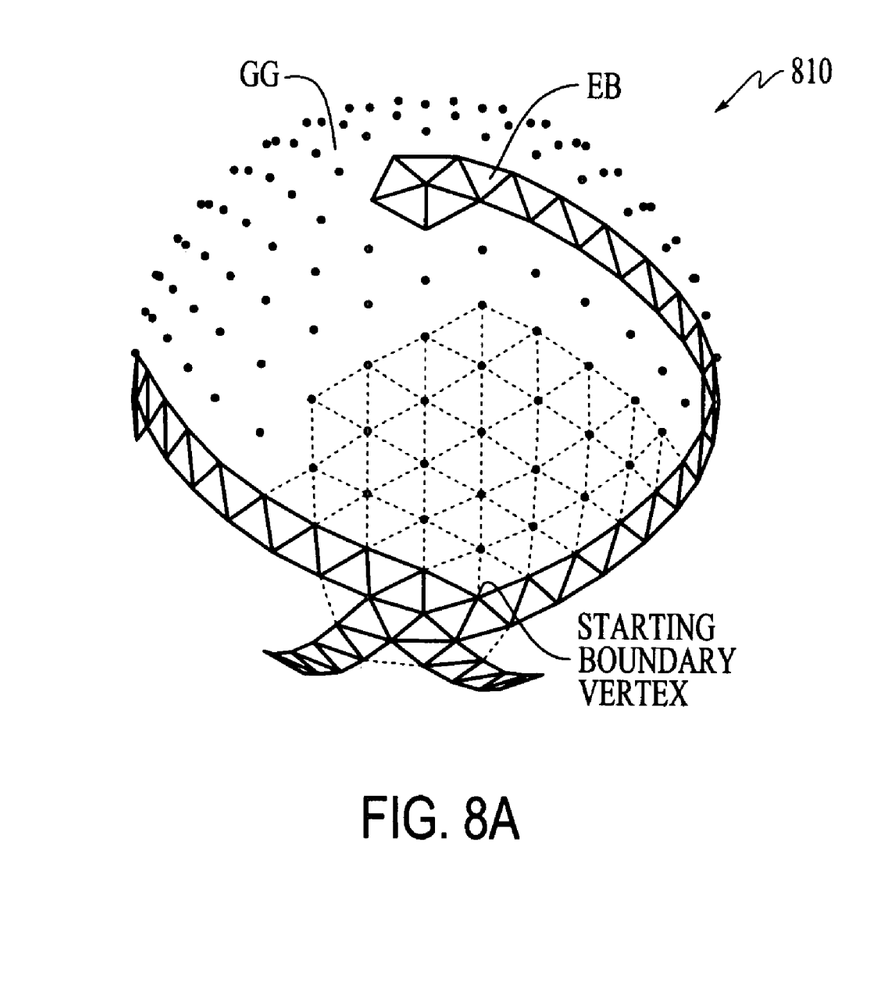
FIGS. 8A and 8B show diagrams of an exemplary 3D triangular mesh model during an exemplary de-compression process.
Figure 8B:
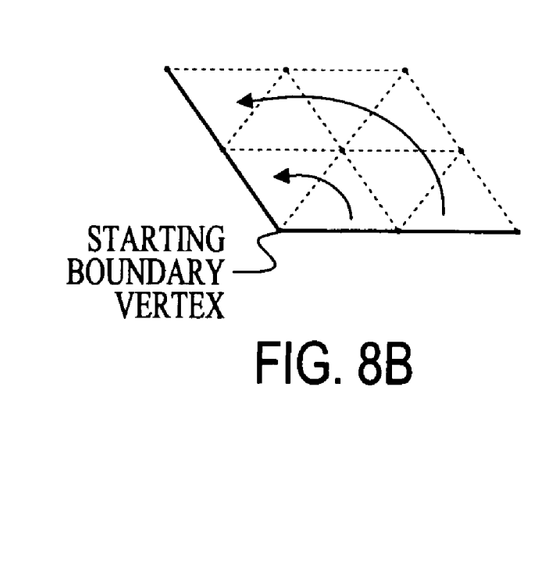

FIGS. 8A and 8B show diagrams of an exemplary 3D triangular mesh model during an exemplary de-compression process. The compressed 3D triangular mesh model 810 can include an EB portion, and a GG portion. The EB portion can explicitly include the geometry information and the connectivity information for a set of vertices. The GG portion can explicitly include the geometry information of a set of regular vertices, and implicitly include the connectivity information of the set of regular vertices. The connectivity information can be determined based on properties of the 3D triangle mesh model.

In an embodiment, the set of regular vertices of the GG portion can be ordered according to a sequence of triangles within the GG portion. Thus, the triangles can be reconstructed based on the order of the set of regular vertices of the GG portion.

In an example, a starting boundary vertex can be identified, for example by a tag or other computational method. Additionally, various data structures can be constructed based on the explicitly included EB portion and the GG portion. In an example, a boundary table can be constructed. The boundary table can sequentially store the boundary vertices of the EB portion, which can also be the boundary vertices of the GG portion. In another example, a GG vertex list can be constructed based on the order of the vertices of the GG portion.

Subsequently, triangles of the GG portion can be sequentially reconstructed, for example by following a counter clock direction as shown in FIG. 8B. A triangle of the GG portion can be reconstructed by using a next vertex either from the GG vertex list, or from the boundary table. Further, the constructed triangles are required to satisfy the valence of the boundary and the internal vertices of the GG portion. Additionally, when a triangle is added to one vertex, another vertex's valence may be affected, such as satisfied. The method can check for adjacent vertices to construct triangles that can be formed by unsatisfied adjacent vertices, for example, in the case of a final triangle. Moreover, various data structures, such as the boundary table, opposite corner table, and the like, may be updated after a triangle is reconstructed.

Various properties of the GG regions can be used to assist constructing the triangles. For example, a closed GG region of valence M, such as boundaries with minimum spans crossing the enclosed region greater than 1 edge length, can satisfy Eq. 1:

$$\sum_{i=1}^{n} (2 - h_i) = M \qquad \text{Eq. 1}$$

where n denotes to a number of boundary vertices of the closed GG region, $h_i$ denotes a number of non-connected edges of the ith boundary vertex.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for compressing a mesh model having geometry information and connectivity information of vertices, comprising:

defining a first set of vertices all having a same valence;
determining a subset of the first set of vertices that are encompassed by an area defined by the first set of vertices;
encoding the mesh model by a processor without the connectivity information for the subset of the first set of vertices; and
encoding the mesh model with the connectivity information for a second set of vertices, the second set comprising (1) a first group including all vertices having different valence from the first set of vertices and (2) a second group including boundary vertices having the same valence of the first set of vertices.

2. The method according to claim 1, wherein defining the first set of vertices having the same valence further comprises:
defining the first set of vertices having a dominant valence.

3. The method according to claim 1, wherein defining the first set of vertices having the same valence further comprises:
defining the first set of vertices having a regular valence.

4. The method according to claim 1, wherein the mesh model is a triangular mesh model and the connectivity information comprises triangles formed by vertices.

5. The method according to claim 4, wherein encoding the mesh model further comprises:
encoding the subset of the first set of vertices with an order, the order systematically traversing triangles of the area.

6. The method according to claim 5, further comprising:
decoding the connectivity information of the subset of the first set of vertices with the order by systematically recovering the triangles of the area to satisfy valences of the vertices.

7. The method according to claim 1, wherein the second set of vertices comprises a vertex having a different connectivity property from the first set of vertices.

8. The method according to claim 7, wherein the vertex has a different valence from the first set of vertices.

9. The method according to claim 1, wherein the second set is a minimal span skeleton of all the vertices having different valences from the first set of vertices.

10. The method according to claim 1, further comprising:
encoding the second set of vertices with a connectivity compression algorithm.

11. The method according to claim 1, further comprising:
encoding the geometry information for the vertices with a geometry compression algorithm.

12. An apparatus for compressing a mesh model having geometry information and connectivity information of vertices, comprising:
a processor configured to define a first set of vertices all having a same valence, determine a subset of the first set of vertices that are encompassed by an area defined by the first set of vertices, encode the mesh model without the connectivity information for the subset of the first set of vertices, and encode the mesh model with the connectivity information for a second set of vertices, the second set comprising (1) a first group including all vertices having different valence from the first set of vertices and (2) a second group including boundary vertices having the same valence of the first set of vertices.

13. The apparatus according to claim 12, further comprising:
a storage unit configured to store the encoded mesh model.

14. The apparatus according to claim 12, further comprising:
a communication interface configured to transmit the encoded mesh model via a communication channel.

15. The apparatus according to claim 12, further comprising:
a memory medium configured to store instructions causing the processor to compress the mesh model.

* * * * *